(12) United States Patent
Richards et al.

(10) Patent No.: US 10,131,266 B2
(45) Date of Patent: Nov. 20, 2018

(54) VEHICLE LAMP

(71) Applicant: Truck-Lite Europe Limited, Harlow Essex (GB)

(72) Inventors: Robert Richards, Harlow Essex (GB); Jamie Carr, Harlow Essex (GB); Daniel Lenart, Harlow Essex (GB)

(73) Assignee: Truck-Lite Europe Limited, Harlow Essex (GB)

( * ) Notice: Subject to any disclaimer, the term of this patent is extended or adjusted under 35 U.S.C. 154(b) by 0 days.

(21) Appl. No.: 15/510,516

(22) PCT Filed: Sep. 11, 2015

(86) PCT No.: PCT/GB2015/052637
§ 371 (c)(1),
(2) Date: Mar. 10, 2017

(87) PCT Pub. No.: WO2016/038386
PCT Pub. Date: Mar. 17, 2016

(65) Prior Publication Data
US 2017/0368979 A1  Dec. 28, 2017

(30) Foreign Application Priority Data

Sep. 11, 2014  (GB) .................................. 1416101.2

(51) Int. Cl.
*B60Q 1/26* (2006.01)
*B60Q 1/00* (2006.01)
(Continued)

(52) U.S. Cl.
CPC ......... *B60Q 1/0052* (2013.01); *B60Q 1/2607* (2013.01); *B60Q 1/38* (2013.01); *F21S 43/14* (2018.01); *H05K 999/99* (2013.01)

(58) Field of Classification Search
CPC ....... B60Q 1/0052; B60Q 1/2607; B60Q 1/38
See application file for complete search history.

(56) References Cited

U.S. PATENT DOCUMENTS 2,343,754 A   3/1944  Donley
5,900,812 A   5/1999  Ruminski et al.
(Continued)

FOREIGN PATENT DOCUMENTS

CN   202656924 U    1/2013
EP   2390135 A1    11/2011
(Continued)

OTHER PUBLICATIONS

International Search Report and Written Opinion issued in International Application Serial No. PCT/GB2015/052637 dated Jan. 8, 2016.

(Continued)

*Primary Examiner* — Thomas M Sember
(74) *Attorney, Agent, or Firm* — Mark H. Whittenberger; Holland & Knight LLP

(57) ABSTRACT

A vehicle lamp (10) with a progressive direction indicator function comprises a direction indicator zone divided into a series of illuminable portions. The direction indicator zone is generally C-shaped, comprising a head 68) and a pair of tails (64, 66), joined by the head (68), that extend in an inboard direction from the head. The tails (64, 66) extend beside each other in the inboard direction and are spaced apart along their length. The head (68) extends between the tails (64, 66) in a direction transverse to the inboard direction, the height of the head (68) in that transverse direction being greater than combined thicknesses of the tails (64, 66) in that transverse direction. To draw an observer's eye in an outboard direction, the illuminable portions are controllable in use to illuminate the direction indicator zone progressively in an outboard direction along the tails (64, 66) to the head (68), and then to illuminate the head convergently in a direction transverse to the outboard direction.

18 Claims, 3 Drawing Sheets

(51) Int. Cl.
*B60Q 1/38* (2006.01)
*F21S 43/14* (2018.01)

(56) References Cited

U.S. PATENT DOCUMENTS

| | | |
|---|---|---|
| 2005/0134447 A1 | 6/2005 | Su |
| 2006/0267752 A1 | 11/2006 | Crunk |
| 2009/0051522 A1 | 2/2009 | Perkins |
| 2009/0051523 A1 | 2/2009 | Perkins |
| 2012/0154137 A1 | 6/2012 | Lin |
| 2012/0155105 A1 | 6/2012 | Emerson |
| 2014/0211449 A1* | 7/2014 | Nomura ................ B60Q 1/302 362/84 |

FOREIGN PATENT DOCUMENTS

| | | |
|---|---|---|
| EP | 2596993 A2 | 5/2013 |
| WO | 9808708 A1 | 3/1998 |
| WO | 2013182802 A1 | 12/2013 |
| WO | 20140105470 A1 | 7/2014 |

OTHER PUBLICATIONS

Written Opinion of the International Preliminary Examining Authority issued in International Application Serial No. PCT/GB2015/052637 dated Sep. 15, 2016.
Combined Search and Examination Report under Sections 17 and 18(3) issued in Application Serial No. GB1416101.2 dated Mar. 10, 2015.
Amendment to Search Report issued in Application Serial No. GB1416101.2 dated Jul. 9, 2015.

* cited by examiner

VEHICLE LAMP

CROSS-REFERENCE TO RELATED APPLICATIONS

The subject application is a U.S. National Stage application of International Application No. PCT/GB2015/052637, filed on Sep. 11, 2015, which claims the priority of Great Britain Patent Application No. 1416101.2, filed Sep. 11, 2014. The contents of both applications are herein incorporated by reference in their entirety.

The present invention relates generally to a lamp for a road vehicle. More specifically, the present invention relates to a rear lamp for a commercial vehicle and particularly to direction indicator functionality of such a lamp.

Road vehicles are usually fitted with a pair of rear lamps, one lamp of the pair being positioned on each side at the rear end of the vehicle. The lens of each lamp includes various optics, typically:

rear position optics to indicate the position of the rear end of the vehicle using lamps and reflex reflectors, which usually illuminate red and may include side marker lamps;

reverse lamp optics to illuminate space behind the vehicle for reversing, which usually illuminate white;

brake lamp optics, which may be combined with or separated from the rear position optics and usually also illuminate red, but with greater brightness than the rear position optics; and direction indicator optics that indicate the driver's intention to turn the vehicle and usually illuminate amber.

Usually the optics of one lamp of the pair are a mirror image of the optics of the other lamp of the pair. Also, the direction indicators of both lamps of the pair flash in unison to convey a hazard warning.

The demands of legislation and vehicle styling place considerable demands upon the relative positions and sizes of the various optics, which must be accommodated in a confined space on the lens of a lamp. That space is usually generally rectangular when viewed from behind when the lamp is oriented for use. Indeed, an elongate generally rectangular lens shape is typical of lamps that are intended to be fitted to various commercial vehicles, such as tractor units and trailer units, either with or without surrounding body panels. Such lamps are usually oriented with the long axis horizontal in use, although they may instead be oriented with the long axis at a different angle such as vertical.

Conventionally, direction indicators simply turn on and off repeatedly. This presents a problem in the event that one rear lamp is obscured by an obstruction or has failed entirely, especially if an observer such as a fellow road user cannot see the outline of the vehicle as a whole. In that case, the observer has no way of knowing whether he or she is looking at the right or left (offside or nearside) rear lamp. Consequently, the observer cannot determine whether the driver intends to turn left or right or indeed whether a hazard warning has been activated instead.

Each of U.S. Pat. No. 2,343,754 and US2006/267752 describe lamps in which illumination of the entire area of the direction indicator optics is switched on and off cyclically. Such lamps can be ineffective at drawing the eye, so it may take an undesirable length of time for an observer to process the direction indication signal.

Even in daylight and clear visibility, it is important for road users quickly to determine the status and likely direction changes of other vehicles. They must understand at a glance what other vehicles are likely to do in time to react accordingly, without being distracted from their own attention to the road. There has therefore been much effort to ensure that vehicle direction indicators convey clear and readily-understood signals.

As a recent example, progressive direction indicators illuminate progressively or sequentially from an inboard end to an outboard end of the direction indicator optics. Examples of such progressive direction indicators are described in EP2596993, EP2390135, US2009/0051523, WO2013/182802 and CN202656924. Specifically, the indicator optics are divided into a series of indicator lamp regions that can be illuminated in sequence. In operation, a first indicator lamp region is illuminated and then during subsequent illumination stages, additional indicator lamp regions are illuminated progressively in an outboard direction. In the arrangements of EP2390135, US2009/0051523 and WO2013/182802, illumination of each region is switched off before illumination of the adjoining region is switched on, such that illumination cycles through successive lamp regions in turn upon activation of a turn signal.

Conversely, EP2596993 and CN202656924 each describe a lamp arrangement in which any illuminated indicator lamp regions stay illuminated as progression continues. Finally after all of the indicator lamp regions have been illuminated, all of them are extinguished before the cycle begins again.

Progressive direction indicators need not progress in straight lines. For example, U.S. Pat. No. 5,900,812 and US2012/0154137 describe the use of arrow-shaped progressive direction indicators, the orientation of the arrow being used to indicate the direction in which the vehicle intends to turn. The head of the arrow has an enlarged illuminated region at its inboard end and a smaller illuminated region at its outboard end, where the head narrows to a point.

In these known progressive direction indicator arrangements, the indicator lamp regions are disposed one beside the next such that the illuminated area simply grows laterally. This provides a partial solution to the problem of ensuring fast and accurate cognitive processing among fellow road users. At least, progressive direction indicators allow an observer to judge whether a vehicle intends to turn left or right, or if the vehicle is signalling a hazard situation, even if one of the rear lamps is obscured. Conversely, WO98/08708 discloses U-shaped optics to indicate the intention of a vehicle to execute a U-turn.

Known progressive direction indicators do not provide a full solution to the problem noted above. There remains a need to maximise the effectiveness of progressive direction indicators for conveying information quickly and accurately to fellow road users. That need must be satisfied without compromising the other functions of a lamp such as rear position, braking and reverse lamp functionality, while meeting legislative requirements.

It is an object of the present invention to provide a vehicle lamp that overcomes or mitigates one or more of the aforementioned problems. Whilst this specification focuses upon rear lamps for commercial vehicles, the inventive concept is broad enough to encompass front lamps and rear lamps for other road vehicles.

In one sense, the invention resides in a vehicle lamp with a progressive direction indicator function, the lamp comprising a direction indicator zone divided into a series of illuminable portions. The direction indicator zone is generally C-shaped, comprising a head and a pair of tails, joined by the head, that extend in an inboard direction from the head. The tails extend beside each other in the inboard direction and are spaced apart along their length. The head extends between the tails in a direction transverse to the inboard direction, the height of the head in that transverse direction being greater than combined thicknesses of the tails in that transverse direction. The illuminable portions are controllable in use to illuminate the direction indicator zone progressively in an outboard direction along the tails to the head, and then to illuminate the head convergently in a direction transverse to the outboard direction.

The inventive concept extends to a lens for a vehicle lamp. The lens comprises a progressive direction indicator zone that is generally C-shaped, comprising a head and a pair of tails, joined by the head, that extend in an inboard direction from the head. The tails extend beside each other in the inboard direction and are spaced apart along their length, and the head extends between the tails in a direction transverse to the inboard direction. The height of the head in that transverse direction is greater than combined thicknesses of the tails in that transverse direction.

The inventive concept also encompasses a method of illuminating a direction indicator zone of a vehicle lamp. The method comprises illuminating tails of the zone progressively and simultaneously in an outboard direction, which tails extend beside each other and are spaced apart along their length, and then convergently illuminating a head of the zone in a direction transverse to the outboard direction, which head extends between and joins the tails.

Additional optional features are set out in the appended dependent claims.

In a specific example within the inventive concept, a vehicle lamp with a progressive direction indicator function comprises a direction indicator zone divided into a series of illuminable portions. The shape of the direction indicator zone comprises an enlarged head and at least one tail that is contiguous with the head and extends inboard from the head. At least an outboard end of the head is thicker than the, or each, tail and the illuminable portions are controllable in use to illuminate an increasing area of the direction indicator zone progressively from an inboard end of the, or each, tail to the outboard end of the head.

Preferably substantially all of the head is thicker than the tail. The head may be thicker than the tail in an outboard direction and/or in a direction transverse to the outboard direction. For example, at least a portion of the head may be offset relative to the tail in a direction transverse to the outboard direction.

There may be a curved transition between the tail and the head of the direction indicator zone. One or more of the illuminable portions suitably effects that curved transition.

The head advantageously comprises at least two illuminable portions, those portions being on an axis that is transverse to the outboard direction. At least one illuminable portion may extend between the tail and the head. The, or each, tail may comprise at least two illuminable portions that are controllable in use to illuminate in outboard succession, thus increasing an illuminated area of the direction indicator zone in an outboard direction along the, or each, tail.

In a preferred embodiment to be described, the lamp of the invention comprises at least one pair of tails. Preferably, the tails of the pair extend beside each other in an outboard direction and are spaced apart along their length. However, it is possible for the tails of the pair to converge in the outboard direction and it is preferred for the tails of the pair to be joined by a common head. In that case, the head suitably extends between the tails of the pair in a direction transverse to the outboard direction.

The lamp may comprise a lens with a convex faceted shape having at least one central face between an upper face and a lower face, the upper face and the lower face both being inclined relative to the central face and being inclined oppositely relative to each other. In that case, one tail of the pair may be on the upper face, the other tail of the pair may be on the lower face, and the head may extend between the tails of the pair across the central face.

In a compact arrangement, a reverse lamp zone or other lamp zone may be disposed between the tails of the pair.

The direction indicator zone is suitably embodied in an elongated lamp cluster, in which case that zone is preferably offset toward one end of the lamp cluster. This leaves space for other lamp functions of the lamp cluster to be offset toward the other end of the lamp cluster. Most preferably, the direction indicator zone is offset toward an inboard end of the lamp cluster.

The vehicle lamp of the invention may also be expressed as having a direction indicator zone divided into a series of illuminable portions, the shape of which zone comprises a head joining at least one pair of tails that extend beside each other in an inboard direction from the head, wherein the illuminable portions are controllable in use progressively to illuminate the direction indicator zone simultaneously in an outboard direction along both tails of the pair and then convergently between the tails across the head in a direction transverse to the outboard direction.

In a specific embodiment of a lens for a vehicle lamp, the lens comprises: a progressive direction indicator zone whose shape comprises an enlarged head and at least one pair of tails contiguous with the head and extending inboard from the head, at least an outboard end of the head being thicker than either tail. The lens may have a convex faceted shape as noted above.

The method of progressively illuminating a direction indicator zone of a vehicle may be expressed as comprising: illuminating a lengthening area of the direction indicator zone progressively from an inboard end of the zone to an outboard end of the zone; and broadening the illuminated area while also lengthening that area, that area remaining broadened to the outboard end of the zone.

The method of the invention may also be expressed as comprising progressively and simultaneously illuminating tails of a direction indicator zone that extend beside each other and then progressively and convergently illuminating a head of the zone joining the tails, in a direction transverse to the outboard direction.

The inventive concept also encompasses a vehicle such as a truck, a tractor unit, a trailer unit or a semi-trailer unit fitted with at least one lamp of the invention.

In order that the invention may be more readily understood, reference will now be made, by way of example, to the accompanying drawings in which.

Figure 2:
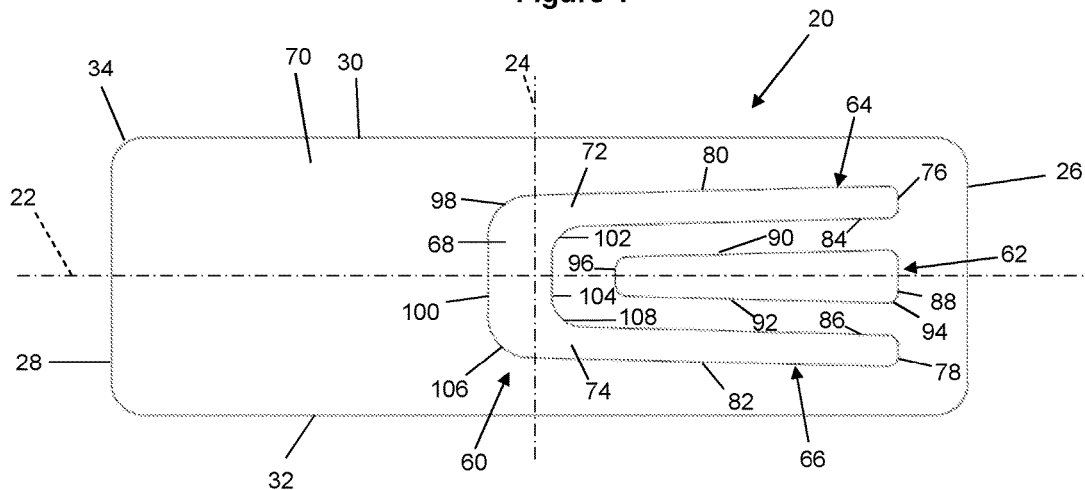
FIG. 2 is a schematic front view of a lens being part of the lamp of FIG. 1, showing direction indicator optics in a fully-off state.
Figure 3:
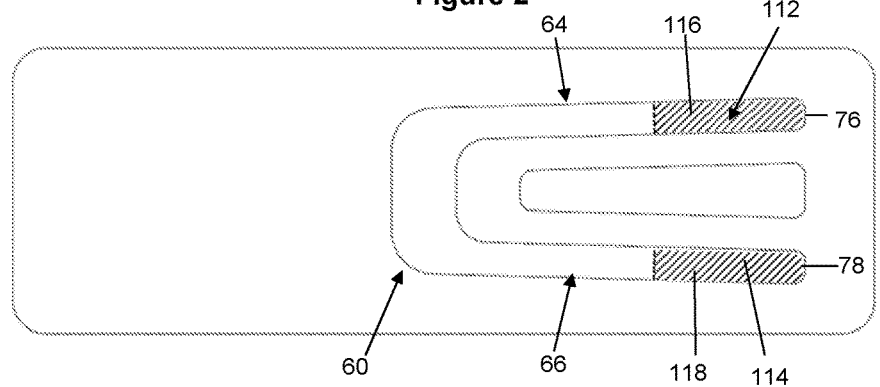
Figure 4:
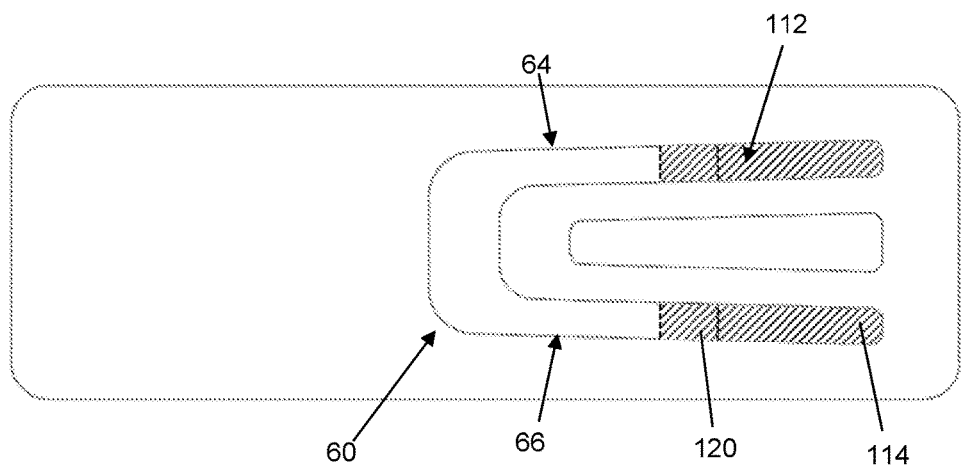
Figure 5:
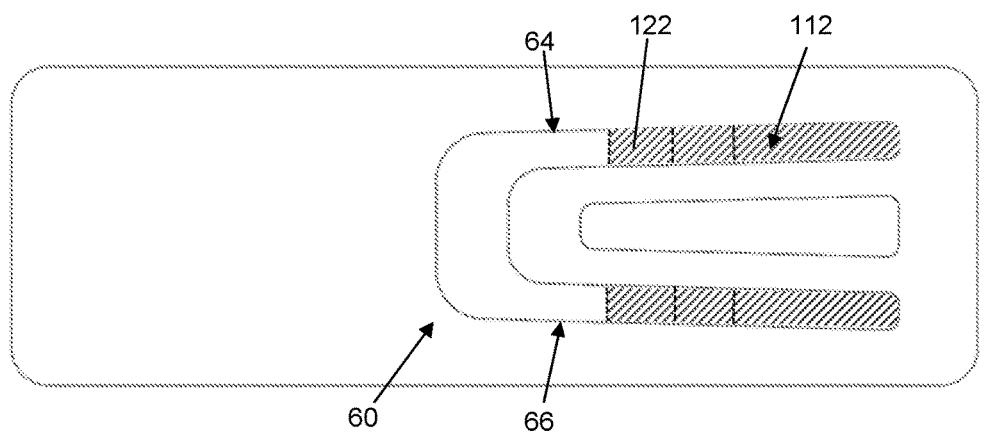
Figure 6:
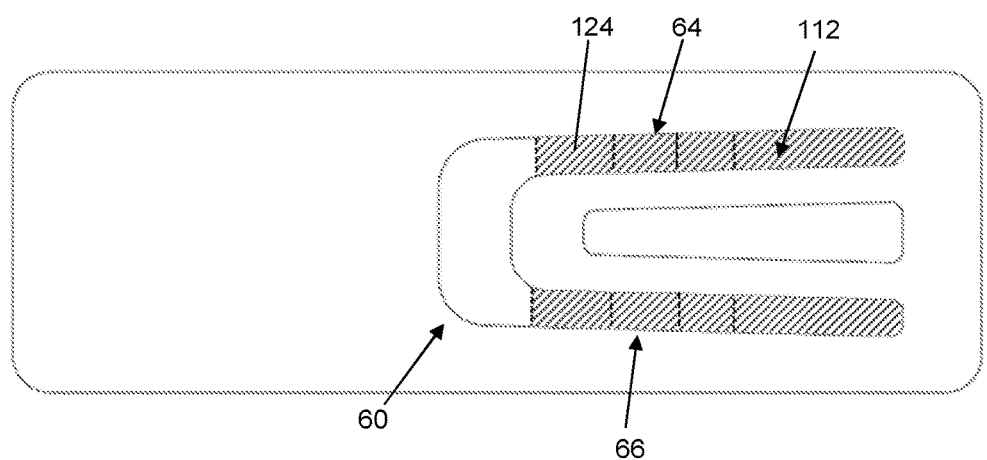
Figure 7:
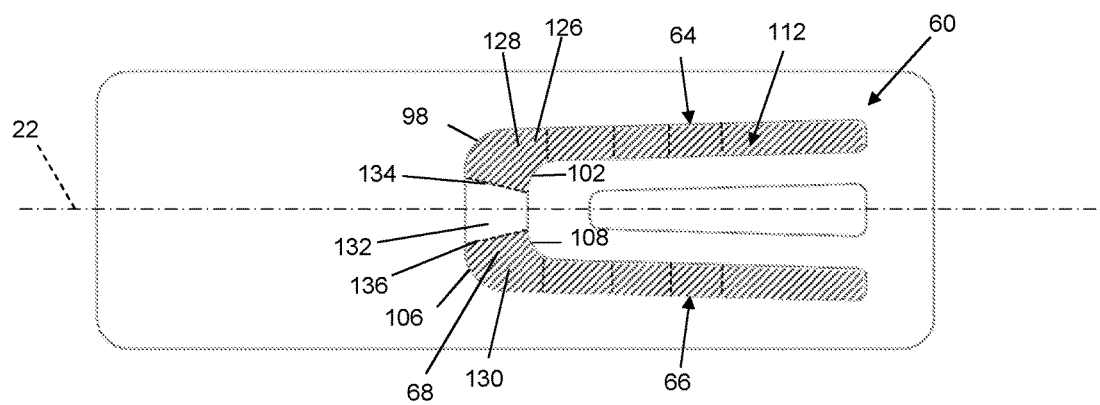
Figure 8:
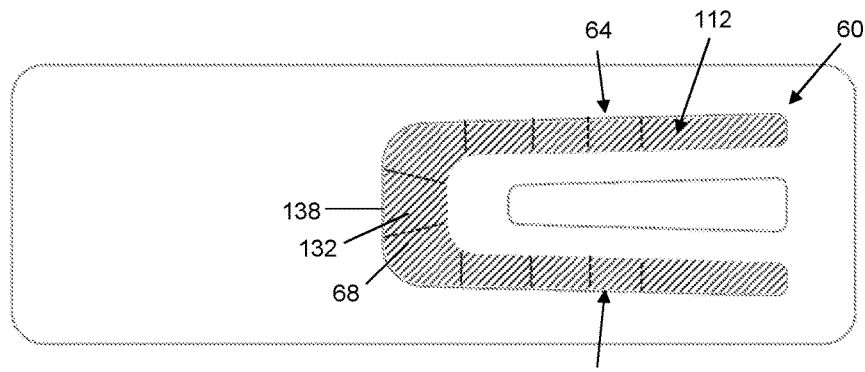
Figure 9:
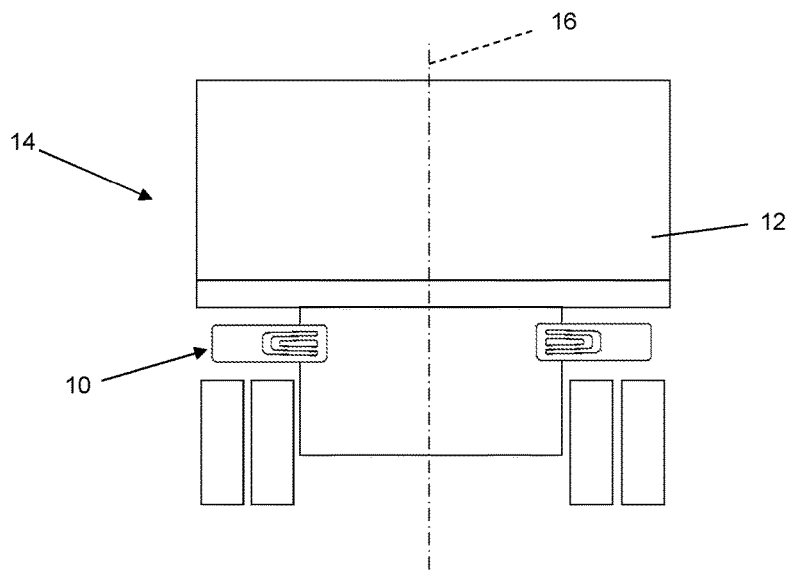

FIG. 3 corresponds to FIG. 2 but shows the direction indicator optics in a first partially-illuminated state;

FIG. 4 corresponds to FIG. 3 but shows the direction indicator optics in a second partially-illuminated state;

FIG. 5 corresponds to FIG. 4 but shows the direction indicator optics in a third partially-illuminated state;

FIG. 6 corresponds to FIG. 5 but shows the direction indicator optics in a fourth partially-illuminated state;

FIG. 7 corresponds to FIG. 6 but shows the direction indicator optics in a fifth partially-illuminated state;

FIG. 8 corresponds to FIG. 7 but shows the direction indicator optics in a fully-illuminated state; and FIG. 9 is a schematic rear view of a commercial vehicle, showing a pair of rear lamps of the invention in their context of use.

Figure 1:
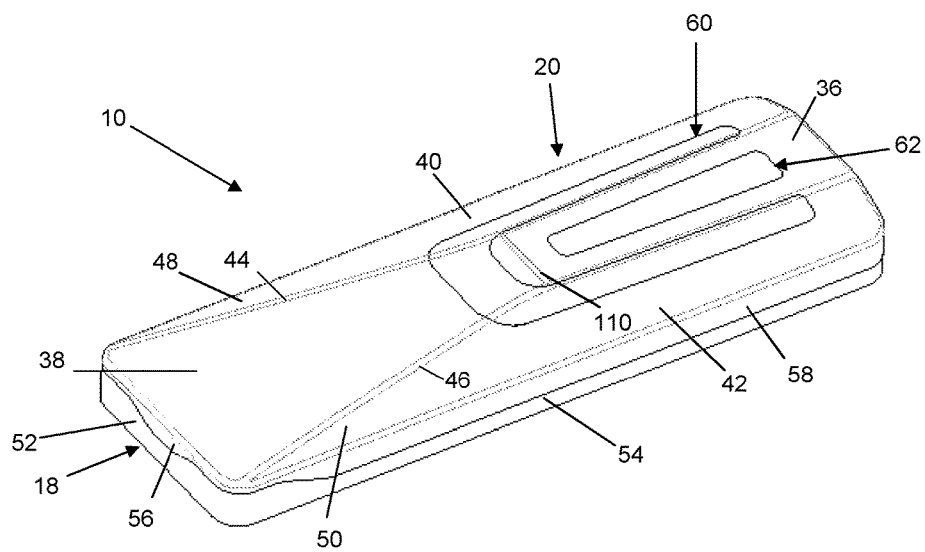
FIG. 1 is a perspective view of a rear lamp for a commercial vehicle.

An embodiment of a rear lamp 10 for a road vehicle is shown in FIG. 1. The lamp 10 is one of a pair of such lamps 10 in which one lamp 10 of the pair is positioned on each side of the rear end 12 of a vehicle 14 as shown in FIG. 9. Only the left-hand rear lamp 10 is shown in the figures for clarity, it being understood that the right-hand rear lamp is a mirror image about a vertical plane 16 extending centrally along the vehicle 14 as also shown in FIG. 9.

The lamp 10 comprises an open-fronted housing 18 enclosed by a lens 20. Contours of the lens 20 are shown in FIG. 1 but as those contours are not essential to the broad inventive concept, they are omitted from the schematic views of the lens 20 in FIGS. 2 to 8.

The housing 18 and the lens 20 of the lamp 10 are substantially rectangular and elongated along a central longitudinal plane 22 that is generally horizontal when the lamp 10 is oriented for use. The central longitudinal plane 22 is shown as a line in FIG. 2, together with an orthogonal line representing a central lateral plane 24 that is generally vertical when the lamp 10 is oriented for use.

The lens 20 is symmetrical about the central longitudinal plane 22 and has an inboard end 26, an outboard end 28, an upper edge 30 and a lower edge 32 that together define a rectangular shape with radiused corners 34. FIG. 1 shows that between those ends 26, 28 and edges 30, 32, the lens 20 has a convex faceted shape comprising a central inboard face 36, a central outboard face 38, an upper face 40 and a lower face 42.

The upper face 40 and the lower face 42 are separated from the central inboard face 36 and the central outboard face 38 by upper and lower boundaries 44, 46 respectively. The upper face 40 and the lower face 42 extend respectively upwardly and downwardly from the upper and lower boundaries 44, 46 to the upper edge 30 and the lower edge 32 (shown in FIG. 2) of the lens 20.

The central inboard face 36 and the central outboard face 38 are orthogonal to the central longitudinal plane 22, whereas the upper and lower faces 40, 42 are inclined relative to the central longitudinal plane 22. The upper and lower faces 40, 42 are oppositely inclined relative to each other in symmetrical mirrored relation about the central longitudinal plane 22.

The central inboard face 36 is in a plane that is orthogonal to the central lateral plane 24 and tapers slightly as a regular trapezium in an outboard direction from the inboard end 26 of the lens 20. Conversely, the central outboard face 38 is in a plane that is inclined relative to the central lateral plane 24 and extends in an outboard direction from the central inboard face 36 to the outboard end 28 of the lens 20.

The central outboard face 38 is a regular trapezium that widens markedly from the relatively narrow central inboard face 36 to the relatively wide outboard end 28. Thus, the upper and lower boundaries 44, 46 splay apart in an outboard direction from the central inboard face 36 to the outboard end 28. It follows that the upper and lower faces 40, 42 are scalene trapeziums that each have an outboard portion 48, 50 tapering in an outboard direction.

FIG. 1 shows that the housing 18 of the lamp 10 comprises an outboard end wall 52 and a lower side wall 54; an inboard end wall and an upper side wall are also present but are obscured. The end and side walls 52, 54 of the housing 18 are cut away to accommodate wrap-around end and side walls 56, 58 of the lens 20 that improve viewing angles and provide for side-marker functionality at the outboard end 28 of the lens 20.

The housing 18 contains lighting elements, typically arrays of LEDs, that selectively illuminate optics of the lens 20 to perform various lighting functions. As is typical of such lamps 10, those optics include direction indicator optics 60 and reverse lamp optics 62. Much of the remainder of the lens area is devoted to other optics, typically rear position optics, side marker lamps and brake lamp optics.

Referring to FIG. 2, the direction indicator optics 60 are substantially C-shaped, comprising an upper arm 64 and a lower arm 66 serving as tails joined by a vertically-extending junction region 68 that serves as a head. The reverse lamp optics 62 are disposed between the upper and lower arms 64, 66 of the direction indicator optics 60. All of these features are symmetrical about the central longitudinal plane 22.

In this example, the direction indicator optics 60 and the reverse lamp optics 62 are offset substantially to the inboard side of the central lateral plane 24, with only an outboard part of the junction region 68 overlapping into the outboard side of the central lateral plane 24.

The offset disposition of the direction indicator optics 60 and the reverse lamp optics 62 and the nested relation of the reverse lamp optics 62 embraced by the arms 64, 66 of the direction indicator optics 60 makes efficient use of the space available across the lens 20 and leaves a substantial portion of the lens 20 available for other optics. Specifically, a large outboard portion 70 of the lens area is available for other lamp functions, in particular rear position optics, side marker lamps and brake lamp optics. However, some of those other lamp functions may also be disposed on the inboard side of the lens 20 to provide additional illumination around or between the direction indicator optics 60 and the reverse lamp optics 62.

The upper and lower arms 64, 66 of the direction indicator optics 60 are substantially straight along most of their length apart from at their outboard ends 72, 74 where they merge in to the junction region 68. Each arm 64, 66 extends from an inboard end 76, 78 inset from the inboard end 26 of the lens 20 to the outboard end 72, 74 that starts to merge with the junction region 68, slightly inboard of the central lateral plane 24. Each arm 64, 66 has an outer edge 80, 82 and an inner edge 84, 86 that are substantially parallel such that the thickness of each arm 64, 66 is generally constant along its length until the arm 64, 66 starts to merge with the junction region 68. The arms 64, 66 are vertically spaced from each other along their whole length but converge towards each other in the outboard direction.

The reverse lamp optics 62 extend in an outboard direction from an inboard edge 88 in line with the inboard end 76, 78 of the arms 64, 66. The reverse lamp optics 62 have an upper edge 90 and a lower edge 92 that are spaced from and parallel to the inner edges 84, 86 of the arms 64, 66. Thus, the reverse lamp optics 62 taper in an outboard direction, forming a regular trapezium with radiused corners 94. An outboard edge 96 of the reverse lamp optics 62 lies spaced from the junction region 68 that joins the arms 64, 66 of the direction indicator optics 60.

The upper and lower arms 64, 66 transition into the junction region 68 of the direction indicator optics 60 by way of curved shoulders, including:
    an upper outer shoulder 98 that curves downwardly from the outer edge 80 of the upper arm 64 towards the central longitudinal plane 22 to join an outboard edge 100 of the junction region 68;

an upper inner shoulder 102 that curves downwardly from the inner edge 84 of the upper arm 64 to join an inboard edge 104 of the junction region 68;

a lower outer shoulder 106 that curves upwardly from the outer edge 82 of the lower arm 66 to join the outboard edge 100 of the junction region 68; and a lower inner shoulder 108 that curves upwardly from the inner edge 86 of the lower arm 66 to join the inboard edge 104 of the junction region 68.

The spacing between the inboard and outboard edges 104, 100 of the junction region 68 exceeds the spacing between the inner and outer edges 84, 86, 80, 82 of the arms 64, 66 of the direction indicator optics 60. Thus, the junction region 68 of the direction indicator optics 60 is thicker than either of the arms 64, 66. In addition, the height of the junction region 68 is greater than the combined thicknesses of the arms 64, 66.

As can be appreciated in FIG. 1, the upper arm 64 of the direction indicator optics 60 lies on the upper face 40 of the lens 20 and the lower arm 66 of the direction indicator optics 60 lies on the lower face 42 of the lens 20. The junction region 68 of the direction indicator optics 60 lies on the central outboard face 38, close to its boundary 110 between the central outboard face 38 and the central inboard face 36. Thus, as the shoulders 98, 102, 106, 108 curve inwardly toward the central longitudinal plane 22, the shoulders 98, 102, 106, 108 cross the upper and lower boundaries 44, 46 between the upper and lower faces 40, 42 and the central outboard face 38. Being located between the arms 64, 66 of the direction indicator optics 60, the reverse indicator optics 62 lie on the central inboard face 36.

In use, the various optics of the lens 20 are illuminated to light the rear end 12 of a vehicle 14 and to indicate the driver's actions or intentions to an observer such as a fellow road user behind the vehicle 14. The operation of optics other than the direction indicator optics 60 is conventional and needs no further elaboration here. Conversely, the operation of the direction indicator optics 60 is unconventional and advantageous as will now be explained with reference to FIGS. 2 to 8, which show how illumination of the direction indicator optics 60 progresses along the arms 64, 66 in an outboard direction and then convergently into the junction region 68.

FIG. 2, like FIG. 1, shows the direction indicator optics 60 in a fully-off state.

In FIGS. 3 to 8, the illuminated region 112 is shown as a hatched region representing how the direction indicator optics 60 are illuminated typically with amber light, although other colours would be possible if legislation permits. The hatched region merely represents the progressive illumination in general terms and should not be interpreted as depicting the exact dimensions of the illuminated region 112 at each stage.

At the first stage of partial illumination, as shown in FIG. 3, a first portion 114 of the direction indicator optics 60 at the inboard end 76, 78 of each arm 64, 66 is illuminated to initiate a growing illuminated region 112. Specifically, the first portion 114 comprises a portion 116 of the upper arm 64 extending outboard from the inboard end 76 of that arm 64 and an equally-sized portion 118 of the lower arm 66 aligned with the corresponding portion 116 of the upper arm 64. The first portion 114 occupies a minor proportion of the overall area of the direction indicator optics 60. However, the first portion 114 must be large enough to be adequately visible and therefore extends nearly half way along the length of the arms 64, 66.

Next, at a second stage of partial illumination shown in FIG. 4, a second portion 120 of the direction indicator optics 60 is illuminated in addition to the first portion 114. The second portion 120 is adjacent to and contiguous with the first portion 114 in an outboard direction, such that the portions of the upper arm 64 and the lower arm 66 that are illuminated are seen by an observer to enlarge and extend the illuminated region 112 in an outboard direction.

During subsequent partial illumination stages shown in FIGS. 5 to 7, additional portions of the direction indicator optics 60 are illuminated progressively in an outboard direction, with already-illuminated portions of the direction indicator optics 60 remaining illuminated as the progression continues. FIGS. 5 to 7 show, respectively, third, fourth and fifth portions 122, 124, 126 of the direction indicator optics 60 that are adjacent to and contiguous with the preceding portions in an outboard direction. As those portions illuminate in turn and the preceding portions remain illuminated, the observer sees the illuminated region 112 continuing to enlarge and extend in an outboard direction.

FIGS. 5 and 6 show the illuminated region 112 enlarging and extending outboard in straight but convergent lines along the upper arm 64 and the lower arm 66 as the third and fourth portions 122, 124 illuminate. FIG. 7 also shows the illuminated region 112 enlarging and extending outboard but now also, in the observer's eyes, curving inwardly toward the central longitudinal plane 22 and enlarging further, in thickness in addition to extent, where the arms 64, 66 merge into the thicker junction region 68. Specifically, the fifth portion 126 of the direction indicator optics 60 that is first illuminated in FIG. 7 comprises two parts, namely an upper part 128 that is bounded by the upper outer shoulder 98 and the upper inner shoulder 102 and a lower part 130 that is bounded by the lower outer shoulder 106 and the lower inner shoulder 108.

A central part 132 of the junction region 68 between the upper and lower parts 128, 130 of the fifth portion 126 is not yet illuminated in FIG. 7. The central part 132 of the junction region 68 is a regular trapezium that widens in an outboard direction. Consequently, boundaries 134, 136 between the central part 132 and the upper and lower parts 128, 130 splay in an outboard direction at equal and opposite acute angles to the central longitudinal plane 22.

FIG. 8 shows the central part 132 of the junction region 68 illuminated to complete the illumination of the direction indicator optics 60. In the observer's eyes, the illuminated region 112 continues to enlarge in the relatively thick junction region 68 but no longer extends in an outboard direction, instead now progressing inwardly toward the central longitudinal plane 22 to complete the C-shape by joining the fully-illuminated arms 64, 66 via the fully-illuminated junction region 68.

After a brief period of full illumination, in accordance with legislation, illumination of the direction indicator optics 60 is extinguished such that the direction indicator optics 60 are once again unlit as depicted in FIGS. 1 and 2. The sequence shown in FIGS. 2 to 8 repeats cyclically thereafter until the driver cancels the direction indicator signal.

Outboard progression of illumination along the direction indicator optics 60 indicates clearly the driver's intention to turn the vehicle 14. Further, the outboard convergence of the upper arm 64 and the lower arm 66 and the conjoining junction region 68 are individually and collectively indicative of the appropriate direction, pointing in an outboard direction like the head of an arrow. However, the head of an arrow narrows to a point and therefore each of the final steps of outboard progression would emit less light than the preceding steps. Counter-intuitively, the direction indicator optics 60 of the invention allow the final steps of outboard progression to emit more light than the preceding steps by virtue of the conjoining junction region 68 and its greater thickness than the arms 64, 66.

The symmetrical, convergent apparent motion of illumination around the shoulders 98, 102, 106, 108 between the arms 64, 66 and the junction region 68 draws the observer's eye to the junction region 68, such that an emphasis is placed on an outboard end 138 of the direction indicator optics 60. In addition, the apparently curved progression of illumination around the shoulders 98, 102, 106, 108 is easy for the eye to follow so as to facilitate cognitive processing of the direction indicator signal.

Features of the direction indicator optics 60 that assist in drawing the eye to the outboard end 138 help an observer quickly to understand the intentions of the driver. This improves road safety.

Finally, as noted previously, FIG. 9 shows a pair of rear lamps 10 of the invention in their context of use, mounted at the rear end 12 of a vehicle 14, in this case a truck. The lamps 10 are in mirrored, handed relation about the vertical plane 16 that extends centrally along the truck 14.

It will be appreciated by a person skilled in the art that the invention could be modified to take many alternative forms to that described herein, without departing from the scope of the appended claims. For example, the arms 64, 66 of the direction indicator optics 60 need not converge but could be parallel. Conversely, the outer edges 80, 82 and inner edges 84, 86 of the arms 64, 66 need not be parallel: for example, the upper and inner arms 64, 66 may taper or widen in an outboard direction.

Whilst the direction indicator optics 60 of the invention have particular advantages when part of a rear lamp cluster unit 10 for a commercial vehicle 14, such optics may be used in other contexts. For example, the direction indicator optics 60 could be used with benefit in isolation, particularly if positioned in correspondingly-shaped apertures in surrounding vehicle bodywork.

The invention claimed is:

1. A vehicle lamp with a progressive direction indicator function, the lamp comprising a direction indicator zone divided into a series of illuminable portions, wherein:
   the direction indicator zone is generally C-shaped, comprising a head and a pair of tails, joined by the head, that extend in an inboard direction from the head, the tails extending beside each other in the inboard direction and being spaced apart along their length;
   the head extends between the tails in a direction transverse to the inboard direction, the height of the head in that transverse direction being greater than combined thicknesses of the tails in that transverse direction; and
   the illuminable portions are controllable in use to illuminate the direction indicator zone progressively in an outboard direction along the tails to the head, and then to illuminate the head convergently in a direction transverse to the outboard direction.

2. The lamp of claim 1, wherein the height of an outboard end of the head is greater than the thickness of either tail.

3. The lamp of claim 1, wherein the height of an outboard end of the head is greater than the combined thicknesses of the tails.

4. The lamp of claim 1, wherein the head has a thickness in the inboard direction that is greater than the thickness of either tail.

5. The lamp of claim 1, wherein the height of substantially all of the head is greater than the thickness of either tail.

6. The lamp of claim 1, wherein the direction indicator zone defines a curved transition between the tail and the head.

7. The lamp of claim 6, wherein an illuminable portion effects the curved transition between the tail and the head.

8. The lamp of claim 1, wherein the head comprises at least two illuminable portions, those portions being on an axis that is transverse to the outboard direction.

9. The lamp of claim 1, wherein at least one illuminable portion extends between each tail and the head.

10. The lamp of claim 1, wherein each tail comprises at least two illuminable portions that are controllable in use to illuminate in outboard succession.

11. The lamp of claim 1, wherein the tails converge in the outboard direction.

12. The lamp of claim 1 and comprising a lens with a convex faceted shape having at least one central face between an upper face and a lower face, the upper face and the lower face both being inclined relative to the central face and being inclined oppositely relative to each other, wherein one tail of the pair is on the upper face, the other tail of the pair is on the lower face, and the head extends between the tails of the pair across the central face.

13. The lamp of claim 1, further comprising a reverse lamp zone disposed between the tails of the pair.

14. The lamp of claim 1, wherein the direction indicator zone is embodied in an elongated lamp cluster and is offset toward one end of the lamp cluster, leaving other lamp functions of the lamp cluster offset toward the other end of the lamp cluster.

15. The lamp of claim 14, wherein the direction indicator zone is offset toward an inboard end of the lamp cluster.

16. A truck, tractor unit, trailer unit, semi-trailer unit or other vehicle fitted with at least one lamp of claim 1.

17. A lens for a vehicle lamp, the lens comprising a progressive direction indicator zone that is generally C-shaped, comprising a head and a pair of tails, joined by the head, that extend in an inboard direction from the head, wherein: the tails extend beside each other in the inboard direction and are spaced apart along their length; and the head extends between the tails in a direction transverse to the inboard direction, the height of the head in that transverse direction being greater than combined thicknesses of the tails in that transverse direction.

18. The lens of claim 17 and having a convex faceted shape comprising at least one central face between an upper face and a lower face, the upper face and the lower face both being inclined relative to the central face and being inclined oppositely relative to each other, wherein one tail of the pair is on the upper face, the other tail of the pair is on the lower face, and the head extends between the tails of the pair across the central face.

* * * * *